United States Patent [19]

Nishio et al.

[11] Patent Number: 4,988,764
[45] Date of Patent: Jan. 29, 1991

[54] IMPACT-RESISTANT POLYPROPYLENE RESIN COMPOSITIONS

[75] Inventors: Takeyoshi Nishio, Okazaki; Toshio Yokoi; Takao Nomura, both of Toyota; Kouhei Ueno, Sakai; Tomohiko Akagawa, Sakai; Ikunori Sakai, Sakai; Yasufumi Takasaki, Sakai, all of Japan

[73] Assignee: Toyota Jidosha Kabushiki Kaisha, Japan

[21] Appl. No.: 500,119

[22] Filed: Mar. 27, 1990

Related U.S. Application Data

[63] Continuation-in-part of Ser. No. 248,192, Sep. 23, 1988, abandoned.

[30] Foreign Application Priority Data

Sep. 29, 1987 [JP] Japan .................. 62-245253

[51] Int. Cl.⁵ ............................................. C08L 77/00
[52] U.S. Cl. ..................................... 525/66; 525/179; 525/183
[58] Field of Search .................. 525/66, 179, 183

[56] References Cited

U.S. PATENT DOCUMENTS 4,363,885  11/1982  Fukui et al. .................. 523/212
4,412,016  10/1983  Fukui et al. .................. 523/206

FOREIGN PATENT DOCUMENTS 57-8246  1/1982  Japan .................. 525/66

Primary Examiner—Ana L. Carrillo
Attorney, Agent, or Firm—Arnold, White & Durkee

[57] ABSTRACT

The polypropylene resin composition of the present invention can be obtained by melt mixing:
(a) a modified polypropylene obtained by grafting a crystalline propylene-ethylene block copolymer with an unsaturated carboxylic acid, or a crystalline polypropylene containing the modified polypropylene,
(b) a polyamide, and
(c) a modified ethylene-α-olefin copolymer rubber obtained by grafting an ethylene-αolefin copolymer rubber with an unsaturated carboxylic acid. This composition is superior in low temperature impact resistance, rigidity, heat resistance and oil resistance.

3 Claims, 1 Drawing Sheet

IMPACT-RESISTANT POLYPROPYLENE RESIN COMPOSITIONS

This is a continuation-in-part of application Ser. No. 07/248,192, filed Sept. 23, 1988, now abandoned.

BACKGROUND

The present invention relates to a polypropylene resin composition having excellent impact resistance.

Crystalline polypropylene has excellent rigidity, excellent heat resistance, a small coefficient of thermal expansion and good moldability and accordingly is in wide use as various molded articles However, it has relatively low impact resistance at low temperatures. In order to improve the impact resistance of crystalline polypropylene, there has been widely effected a method comprising adding to a polypropylene an ethylene-α-olefin copolymer rubber or a polyethylene.

This method, however, has a problem of reducing the rigidity, heat resistance, coil resistance, etc. of polypropylene.

Meanwhile, it has been tried to add a polyamide to a polypropylene to improve the heat resistance, oil resistance, tensile strength, etc. of polypropylene. However, since a polypropylene and a polyamide has no compatibility with each other, cleavage occurs after they are melt mixed and no desired material can be obtained. Hence, there is generally used a modified polypropylene obtained by grafting a polypropylene with an unsaturated carboxylic acid or its derivative (see Japanese Patent Publication No. 30945/1970). In this improved method, the compatibility between a polypropylene and a polyamide is improved and the polyamide is dispersed in the polypropylene matrix in microstructures. In this improved method, however, the impact resistance of polypropylene is improved hardly. Hence, there was proposed a method comprising adding to a polypropylene and a polyamide an agent for making them compatible with each other and for improving the impact resistance of the polypropylene, that is, a modified ethylene-α-olefin copolymer rubber obtained by grafting an ethylene-α-olefin copolymer rubber with an unsaturated carboxylic acid or its derivative [see Japanese Patent Application Kokai (Laid-Open) No. 149940/1984]. In this method, the compatibility between polypropylene and polyamide and the impact resistance of polypropylene are improved; however, the resulting composition is not satisfactory in dispersibility of polyamide and low temperature impact resistance.

As a measure for the compatibility and impact resistance of a polypropylene-polyamide mixture, there can be mentioned the particle diameters of finely dispersed polyamide domains. It is necessary to disperse these polyamide domains in desired particle diameters (0.3-1.0 μm). In order to attain such dispersion, it is necessary not only to modify a polypropylene or an ethylene-α-olefin copolymer rubber as mentioned above but also to specify the correlation of the melt viscosities of a modified polypropylene and a polyamide when they are melt mixed at a given shear rate.

SUMMARY OF THE INVENTION

The present inventors made extensive study in order to obtain a polypropylene-polyamide mixture with improved compatibility and improved impact resistance and found that it is possible to obtain a polypropylene resin composition having stably dispersed polyamide domains and excellent impact resistance. The finding has led to the completion of the present invention.

According to the present invention there is provided an impact-resistance polypropylene resin composition obtained by melt mixing:

(a) 80–20 parts by weight of a modified polypropylene obtained by grafting a crystalline propylene ethylene block copolymer having a melt index of 0.3–30 g/10 min. and an ethylene content of 3–15% by weight with 0.03–5 parts by weight, based on 100 parts by weight of the crystalline propylene-ethylene block copolymer, of an unsaturated carboxylic acid or its derivative, or a crystalline polypropylene containing at least 5% by weight of the modified polypropylene, (b) 20–80 parts by weight of a polyamide having a melt viscosity $\eta_b$ 1.0–15, preferably 1.0–5.0 times the melt viscosity $\eta_a$ of the component (a) at the shear rate when the melt mixing of the components (a), (b) and (c) is effected, and (c) 2–60 parts by weight, based on 100 parts by weight of the total of the components (a) and (b), of a modified ethylene-α-olefin copolymer rubber obtained by grafting an ethylene-α-olefin copolymer rubber having a Mooney viscosity $ML_{1+4}(100°\,C.)$ of 10–150 and an ethylene content of 30–90% by weight with 0.03–5 parts by weight, based on 100 parts by weight of the ethylene-α-olefin copolymer rubber, an unsaturated carboxylic acid or its derivative.

DETAILED DESCRIPTION OF THE PREFERRED EMBODIMENTS

Figure 1:
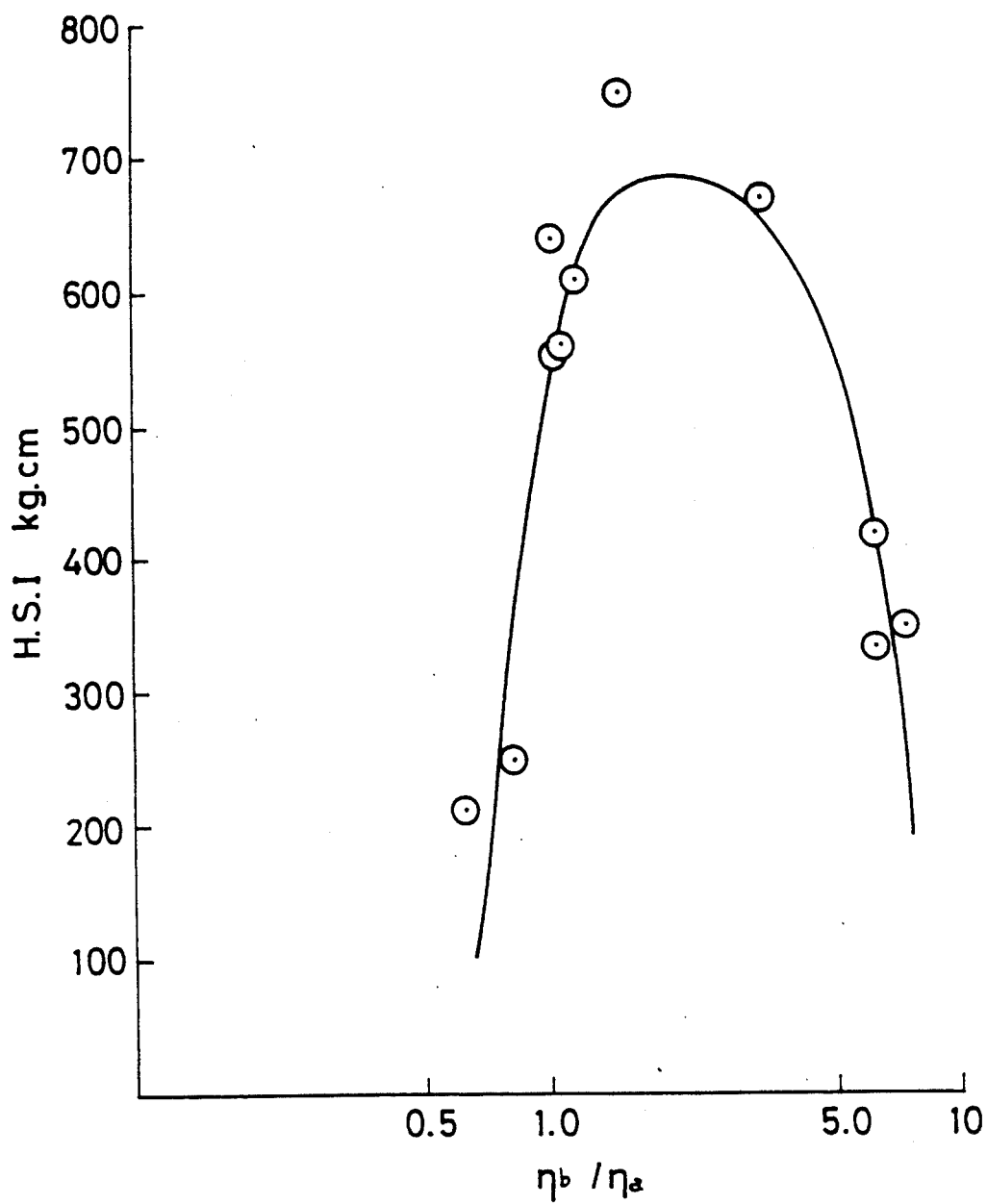
FIG. 1 shows a graph of high rate impact strength (HSI) vs. $\eta_b/\eta_a$ of the data in Table 2, discussed hereinbelow.

In the present invention, the starting polypropylene used for obtaining a modified polypropylene comprises mainly a crystalline propylene ethylene block copolymer having a melt index as measured at 230° C. under a load of 2,160 g according to ASTM D 1238 (the same measurement conditions applies hereinafter), of 0.3–30 g/10 min and an ethylene content of 3–15% by weight. The starting polypropylene may further comprise a crystalline propylene homopolymer or a propylene-ethylene random copolymer. The starting polypropylene is especially preferably a crystalline propylene-ethylene block copolymer having an ethylene content of 3–10% by weight.

As the graft monomer used for obtaining a modified polypropylene, there is used an unsaturated carboxylic acid or its derivative.

Such an unsaturated carboxylic acid or its derivative includes unsaturated carboxylic acids such as acrylic acid, methacrylic acid, maleic acid, itaconic acid, fumaric acid, citraconic acid, crotonic acid and the like, and acid anhydrides such as maleic anhydride, itaconic anhydride, citraconic anhydride and the like. An acid anhydride such as maleic anhydride, itaconic anhydride or the like is preferred.

The initiator used for obtaining a modified polypropylene has no restriction and can be any so long as it has a half-life period of 1 minute and its decomposition temperature required for obtaining the half-life period is not lower than the melting point of the starting polypropylene and not higher than 250° C. When said decomposition temperature is higher than 250° C., the amount of the radical generated during the grafting reaction decreases, making the grafting reaction less efficient in some cases. The initiator includes, for example, organic peroxides such as hydroperoxide, dialkyl peroxides, peroxy esters and the like. As specific examples of the organic peroxides used in the present invention, there can be mentioned t-butyl peroxybenzoate, cyclohexanone peroxide, 2,5-dimethyl-2,5-di(benzoylperoxy)hexane, t-butyl peroxyacetate, methyl ethyl ketone peroxide, dicumyl peroxide and 2,5-dimethyl 2,5-di(t-butylperoxy)hexane. In actual use, an appropriate initiator is selected depending upon the reaction conditions employed.

The acid-grafted crystalline polypropylene can be obtained by mixing a starting polypropylene, a graft monomer and an initiator and melt kneading them in a nitrogen stream or air. The melt kneading is ordinarily conducted using a single-screw extruder although it may be conducted using a means such as twin-screw extruder, kneader, Banbury mixer or the like. The mixing temperature is required to be higher than the melting point of the starting polypropylene and is ordinarily about 175°–280° C. The kneading time differs by the materials used, etc. but is ordinarily about 1–20 minutes.

The mixing proportions are such that the grafting monomer is used in an amount cf about 0.03–5 parts by weight, preferably 0.1–3.0 parts by weight and the initiator is used in an amount of about 0.002–1 part by weight, both based on 100 parts by weight of the starting polypropylene.

When the amount of the grafting monomer is less than about 0.03 part by weight, the grafted polypropylene has no modification effect, and when the amount is more than 5 parts by weight, the grafting efficiency is extremely low and the proportion of unreacted grafting monomer is high.

Preferably, the modified polypropylene has a monomer grafting degree of at least 0.03% by weight, preferably 0.1–5.0% by weight and a melt index of about 0.5–200 g/10 min.

When the melt index of the modified polypropylene is smaller than about 0.5 g/10 min, the resulting polypropylene resin composition possesses low moldability in some cases. When the melt index is larger than about 200 g/10 min, the resulting modified polypropylene has too low a molecular weight and accordingly it is impossible to obtain a desired polypropylene resin composition with improved low temperature impact resistance.

The polyamide used in the present invention includes, for example, polyamides obtained by polycondensing a diamine (e.g. aliphatic diamine, alicyclic diamine, aromatic diamine) with a dicarboxylic acid (e.g. aliphatic dicarboxylic acid, alicyclic dicarboxylic acid, aromatic dicarboxylic acid), polyamides obtained from a lactam, polyamides obtained by condensing an aminocarboxylic acid, copolymer polyamides composed of these components, and mixtures of these polyamides. Specific examples of the polyamide are nylon 6, nylon 66, nylon 610, nylon 9, nylon 11, nylon 12 and nylon 6/66. Of these, nylon 6 and nylon 66 are particularly preferred in view of the melting point and melt viscosity relative to those of the modified polypropylene when the melt mixing of the components (a), (b) and (c) is effected.

The polyamide is required to have a melt viscosity b 1.0–15 times, preferably 1.0–5 times the melt viscosity a of the modified polypropylene when the melt mixing of the components (a), (b) and (c) is effected. When the melt viscosity of the polyamide is smaller than 1.0 times the melt viscosity of the modified polypropylene, the modified polypropylene does not act as a sufficient matrix and the resulting polypropylene resin composition tends to cause cleavage. When the melt viscosity is larger than 15 times, the polyamide is dispersed in the modified polypropylene matrix as dispersed polyamide domains but the polypropylene resin composition obtained has only slightly improved impact resistance. It is preferred that $\eta_b/\eta_a$ is 0.1 to 5.0.

The viscosity mentioned herein refers to an apparent viscosity as measured at a temperature and shear rate employed during melt mixing, using a Koka Shiki flow tester.

The ethylene-α-olefin copolymer rubber used as a starting material for obtaining modified ethylene-α-olefin copolymer rubber has an ethylene content of 30–90% by weight, preferably 60–90% by weight. The α-olefin component has 3–18 carbon atoms and includes, for example, propylene, 1-butene, 1-hexene, 4-methyl-1-pentene and 1-decene. These α-olefin components can be used singly or in combination of two or more.

The ethylene-α-olefin copolymer rubber further has a Mooney viscosity $ML_{1+4}(100°C.)$ of 10–150, preferably 20–130.

The graft monomer used for grafting the ethylene-α-olefin copolymer, similarly to the graft monomer used for grafting the crystalline polypropylene, is an unsaturated carboxylic acid or its derivative.

A radical-generating compound such as the same organic peroxide as mentioned previously can be used an initiator in the above grafting reaction Alternatively, the grafting reaction may be effected thermally without using any initiator.

The modified ethylene-α-olefin copolymer rubber can be produced by subjecting 100 parts by weight of an ethylene-α-olefin copolymer rubber and 0.03–5 parts by weight, preferably 0.1–3.0 parts by weight of a graft monomer to solution stirring in the presence of 0.002–1 part by weight of an initiator, or by subjecting an ethylene-α-olefin copolymer rubber and a graft monomer to melt kneading with heating.

When the monomer amount is less than 0.03 part by weight, no modification effect is obtained, and when the amount is more than 5 parts by weight, the grafting efficiency is extremely low and the proportion of unreacted monomer is high.

The modified ethylene-α-olefin copolymer rubber is produced so as to have a monomer grafting degree of about 0.05–5.0% by weight, preferably about 0.1–3.0% by weight and a melt index of about 0.01–20 g/10 min, preferably 0.05–15 g/10 min by appropriately selecting the material proportions and reaction conditions.

When the monomer grafting degree of the modified ethylene-α-olefin copolymer rubber is smaller than 0.05% by weight, the modified rubber has substantially no modification effect and the final polypropylene resin composition shows no improvement in low temperature impact resistance. When the grafting degree is larger than 5.0% by weight, the modified rubber has an increased crosslinking degree as a result of grafting, making difficult the melt mixing of the components (a) to (c) for obtaining a final polypropylene resin composition.

As mentioned above, the grafting of the polypropylene and the ethylene-α-olefin copolymer rubber can be effected independently, but it can also be effected simultaneously after mixing the polypropylene and the ethylene-α-olefin copolymer rubber.

The impact-resistant polypropylene resin composition of the present invention is constituted by:

(a) 80–20 parts by weight, preferably 80–40 parts by weight, more preferably 80–55 parts by weight of the above mentioned modified polypropylene or a crystalline polypropylene containing at least 5% by weight of the modified polypropylene, (b) 20–80 parts by weight, preferably 20–60 parts by weight, more preferably 20–45 parts by weight of the above-mentioned polyamide having a viscosity 1.0–15, preferably 1.0–5.0 times that of the modified polypropylene at the shear rate when the melt mixing of the components (a) to (c) is effected, and (c) 2–60 parts by weight, preferably 5–40 parts by weight, based on 100 parts by weight of the total of the components (a) and (c), of the above-mentioned modified ethylene-α-olefin copolymer rubber as an impact resistance improver. When the content of the modified polypropylene is less than 20 parts by weight, no compounding effect is obtained and the resulting composition shows high hygroscopicity due to the high content of the polyamide component (b) and comes to have altered properties. When the content of the modified polypropylene is more than 80 parts by weight, no improvement effect by the polyamide (b) can be recognized.

The impact-resistant polypropylene resin composition of the present invention can be obtained as pellets or a powder by melt mixing the modified polypropylene (a), the polyamide (b) and the modified ethylene-α-olefin copolymer rubber (c) in the above mentioned proportions using a known means such as single-screw extruder, twin-screw extruder, kneader, Banbury mixer or the like.

The polypropylene resin composition of the present invention may comprise various additives conventionally used in polypropylenes such as antioxidant, ultraviolet absorber, lubricant, pigment, antistatic agent, copper inhibitor, flame retardant, neutralizing agent, foaming agent, plasticizer, nucleating agent, dye and inorganic filler (e.g. talc, mica, glass fiber, calcium carbonate).

The impact resistant polypropylene resin composition of the present invention is superior to conventional polypropylene resin compositions in low temperature impact resistance and moreover has rigidity, heat resistance and oil resistance at least equal to those inherently possessed by polypropylene resins.

The present composition, being superior in rigidity, impact resistance and heat resistance, can be suitably used in various industrial parts such as automobile parts and electrical parts.

The present invention is illustrated in more detail by way of examples. However, the present invention is in no way restricted to these examples.

EXAMPLE 1

100 parts by weight of a crystalline ethylene-propylene block copolymer having a melt index of 1.0 g/10 min and an ethylene content of 10% by weight, 0.2 part by weight of maleic anhydride and 0.2 part by weight of t-butyl peroxybenzoate were melt mixed at 220° C. using a single-screw extruder to obtain a modified polypropylene EX 1. Then, using a single-screw extruder and at 250° C., there were melt mixed 55% by weight of this modified polypropylene EX 1, 40% by weight of nylon 6 having a melt viscosity 1.5 times that of the modified polypropylene EX 1 at 250° C. at a shear rate of $10^3$ sec$^{-1}$ and 5% by weight of a modified ethylene-propylene copolymer rubber EX 2 obtained by stirring 100 parts by weight of an ethylene-propylene copolymer rubber having an ethylene content of 73% by weight, 0.8 part by weight of maleic anhydride and 0.4 part by weight of dicumyl peroxide at 100° C. in p-xylene, to obtain a polypropylene resin composition Y-1.

The resin composition was measured for various properties such as tensile strength, flexural strength, flexural modulus, Izod impact strength, deflection temperature (heat distortion temperature), surface hardness and high rate impact strength. The results are shown in Table 1.

EXAMPLE 2

The procedure of Example 1 was repeated except that the proportion of EX 1 was changed to 50% by weight and the proportion of EX 2 was changed to 10% by weight, to obtain a polypropylene resin composition Y-2. The properties of Y-2 are shown in Table 1.

EXAMPLE 3

The procedure of Example 2 was repeated except that EX 2 was changed to a modified ethylene-1-butene copolymer rubber, to obtain a polypropylene resin composition X-1. The properties of X-1 are shown in Table 1.

COMPARATIVE EXAMPLE 1

The procedure of Example 1 was repeated except that no EX 2 was used and the proportion of EX 1 was increased to 60% by weight, to obtain a polypropylene resin composition Z-1. The properties of Z-1 are shown in Table 1.

COMPARATIVE EXAMPLE 2

The procedure of Example 1 was repeated except that EX 1 was changed to an unmodified polypropylene to obtain a polypropylene resin composition Z-2. The properties of Z-2 are shown in Table 1.

COMPARATIVE EXAMPLE 3

The procedure of Example 1 was repeated except that there was used a polyamide having a melt viscosity 0.8 times that of EX 1, to obtain a polypropylene resin composition Z-3. The properties of Z-3 are shown in Table 1.

Incidentally, the properties of the above polypropylene resin compositions were measured according to the following test methods.

| Tensile strength: | ASTM D 638 |
|---|---|
| Flexural strength and flexural modulus: | ASTM D 790 |
| Izod impact strength: | ASTM D 256 |
| Deflection temperature | ASTM D 648 |
| Surface hardness: | ASTM D 785 |
| High rate impact strength: | |

A disc of 1.6 mm in thickness and 100 mm in diameter was made. This disc was used as a test piece. A round missile was dropped on the disc at a speed of 2.5 m/sec at −30° C. The high rate impact strength of the disc was calculated from an area formed by the stress-strain curve obtained a the time of destruction, according to a plane impact measurement method (an Ube method).

TABLE 1

| Composition | Example 1 Y-1 | Example 2 Y-2 | Example 3 X-1 | Comparative Example 1 Z-1 | Comparative Example 2 Z-2 | Comparative Example 3 Z-3 |
|---|---|---|---|---|---|---|
| Compounding recipe | | | | | | |
| Polypropylene (% by weight) | Modified polypropylene (55) | Modified polypropylene (50) | Modified polypropylene (50) | Modified polypropylene (60) | Unmodified polypropylene (50) | Modified polypropylene (50) |
| Polyamide (% by weight) | Nylon 6 (40) | Nylon 6 (40) | Nylon 6 (40) | Nylon 6 (40) | Nylon 6 (40) | Nylon 6 having a melt viscosity outside the specified (40) |
| Ethylene-α-olefin copolymer rubber (% by weight) | Modified EPR (5) | Modified EPR (10) | Modified EBR (10) | — | Modified EPR (10) | Modified EPR (10) |
| Properties | | | | | | |
| Tensile strength (kg/cm$^2$) | 350 | 310 | 320 | 380 | 260 | 280 |
| Flexural strength (kg/cm$^2$) | 570 | 480 | 490 | 650 | 430 | 450 |
| Flexural modulus (kg/cm$^2$) | 16,500 | 13,500 | 13,500 | 20,000 | 21,500 | 13,000 |
| Izod impact strength at −30° C. (kg·cm/cm) | 15 | 20 | 22 | 8 | 10 | 12 |
| Deflection temperature (4.6 kg/cm$^2$) (°C.) | 125 | 120 | 120 | 127 | 115 | 115 |
| Surface hardness (R scale) | 90 | 75 | 77 | 100 | 93 | 90 |
| High rate impact strength at −30° C. (kg·cm) | 650 | 750 (N.B.) | 770 (N.B.) | 80 | 50 | 250 |

EPR: ethylene-propylene rubber
EBR: ethylene-1-butene rubber

Additional testing was carried out to evidence the criticality of the $\eta_b/\eta_a$ ratio for varying resin compositions. Table 2 shows various properties of each resin composition obtained in a case of changing the melt viscosity ratio ($\eta_b/\eta_a$). FIG. 1 shows a plot of high rate impact strength (HSI) vs. $\eta_b/\eta_a$, as recited in Table 2. The criticality of the claimed $\eta_b/\eta_a$ value of 1.0–5.0 is shown in FIG. 1. Additionally, in the case that HSI is below 500 kg·cm ($\eta_b/\eta_1$ is outside the range of 1.0–5.0), the composition is destroyed via brittleness breakdown. In the case that HSI is above 500 kg·cm ($\eta_b/\eta_a$ is within 1.0–5.0), the composition may be destroyed via ductility breakdown.

TABLE 2

| | Example | | | | | Comparative Example | | | | |
|---|---|---|---|---|---|---|---|---|---|---|
| | 4 | 5 | 6 | 7 | 8 | 4 | 5 | 6 | 7 | 8 |
| Compounding recipe | | | | | | | | | | |
| Modified polypropylene (% by weight) | PP-1(50) | PP-2(50) | PP-2(50) | PP-3(50) | PP-4(50) | PP-1(50) | PP-2(50) | PP-2(50) | PP-3(50) | PP-2(20) |
| Polyamide (% by weight) | PA-4(40) | PA-2(40) | PA-3(40) | PA-2(40) | PA-1(40) | PA-2(40) | PA-1(40) | PA-4(40) | PA-4(40) | PA-4(70) |
| Ethylene-α-olefin copolymer rubber (% by weight) | Modified ERP (10) | Modified ERP (10) | Modified ERP (10) | Modified ERP (10) | Modified ERP (10) | Modified ERP (10) | Modified ERP (10) | Modified ERP (10) | Modified ERP (10) | Modified ERP (10) |
| $\eta_b/\eta_a$ | 3.36 | 1.03 | 1.54 | 1.19 | 1.10 | 0.62 | 0.81 | 6.18 | 7.1 | 6.18 |
| Dispersion of Polyamide | Good | Good | Good | Good | Good | Bad | Bad | Somewhat bad | Somewhat bad | Somewhat bad |
| Properties | | | | | | | | | | |
| Tensile strength (kg/cm$^2$) | 305 | 310 | 310 | 315 | 315 | 250 | 280 | 290 | 285 | 200 |
| Flexural strength (kg/cm$^2$) | 470 | 480 | 480 | 480 | 485 | 350 | 450 | 440 | 445 | 320 |
| Flexural modulus (kg/cm$^2$) | 13,500 | 13,500 | 13,500 | 13,600 | 13,600 | 12,800 | 13,000 | 13,500 | 13,000 | 11,000 |
| Izod impact strength at −30° C. (kg·cm/cm) | 19 | 19 | 20 | 18 | 17 | 5 | 12 | 13 | 11 | 10 |
| Deflection temperature (4.6 kg/cm$^2$) (°C.) | 120 | 119 | 120 | 120 | 120 | 115 | 115 | 118 | 117 | 112 |
| Surface hardness (R scale) | 76 | 76 | 75 | 75 | 77 | 85 | 90 | 78 | 80 | 72 |
| High rate impact strength (HSI) at −30° C. | 670 | 640 | 750 (N.B.) | 610 | 560 | 250 | 250 | 420 | 350 | 330 |

TABLE 2-continued

|  | Example | | | | | Comparative Example | | | | |
| --- | --- | --- | --- | --- | --- | --- | --- | --- | --- | --- |
|  | 4 | 5 | 6 | 7 | 8 | 4 | 5 | 6 | 7 | 8 |
| (kg · cm) | | | | | | | | | | |

EPR: ethylene-propylene rubber
EBR: ethylene-1-butene rubber
PP-1: Melt index = 3, $\eta_a$ = 1250 poise
PP-2: Melt index = 20, $\eta_a$ = 680 poise
PP-3: Melt index = 30, $\eta_a$ = 590 poise
PP-4: Melt index = 50, $\eta_a$ = 500 poise
PA-1: Molecular weight = 11,000, $\eta_b$ = 550 poise
PA-2: Molecular weight = 13,000, $\eta_b$ = 700 poise
PA-3: Molecular weight = 15,000, $\eta_b$ = 1050 poise
PA-4: Molecular weight = 30,000, $\eta_b$ = 4200 poise The following Table 3 shows each melt index (MFR) of non-modified polypropylene and modified polypropylene thereof. The modifying conditions of Table 3 are the same as those used in Example 1 discussed above.

TABLE 3

| Melt index of starting propylenfied polypropylene* (g/10 min) | Maleic anhydride (wt %) | t-butylperoxybenzoate (wt %) | Melt index of modified polypropylene (g/10 min) |
| --- | --- | --- | --- |
| 0.4 | 0.15 | 0.1 | 3 |
| 1 | 0.2 | 0.2 | 20 |
| 3 | 0.15 | 0.1 | 30 |
| 3 | 0.15 | 0.15 | 50 |

*Crystalline ethylene-propylene block copolymer having an ethylene content of 10% by weight The following Table 4 shows various properties of a non-modified polypropylene (Comparative Example 9) and a composition (Comparative Example 10) which comprises a non-modified polypropylene and a modified ethylene-propylene copolymer rubber.

TABLE 4

|  | Comparative Example 9 | Comparative Example 10 | Example 6 |
| --- | --- | --- | --- |
| Compounding recipe | | | |
| Polypropylene (% by weight) | Polypropylene (Melt index = 20) | Polypropylene (Melt index = 20) (80% by weight) | Modified polypropylene (50% by weight) |
| Polyamide (% by weight) | — | — | PA-3 (40% by weight) |
| Ethylene-α-olefin copolymer rubber (% by weight) | — | Modified EPR (20% by weight) | Modified EPR (10% by weight) |
| Properties | | | |
| Tensile strength (kg/cm²) | 295 | 200 | 310 |
| Flexural strength (kg/cm²) | 510 | 350 | 480 |
| Flexural modulus (kg/cm²) | 15,500 | 11,500 | 13,500 |
| Izod impact strength at −30° C. (kg · cm/cm) | 6 | 9 | 20 |
| Deflection temperature (4.6 kg/cm²) (°C.) | 125 | 116 | 120 |
| Surface hardness (R scale) | 92 | 73 | 75 |
| High rate impact strength (HSI) at −30° C. (kg · cm) | 190 | 550 | 750 |

PA-3: Molecular weight = 15,000, $\eta_b$ = 1050 poise

What is claimed is:

1. An impact-resistant polypropylene resin composition obtained by melt mixing:
   (a) 80–55 parts by weight of a modified polypropylene obtained by grafting a crystalline propylene-ethylene block copolymer having a melt index of 0.3–30 g/10 min and an ethylene content of 3–15% by weight with 0.03–5 parts by weight, base on 100 parts by weight of the crystalline propylene-ethylene block copolymer, of an unsaturated carboxylic acid or its derivative, or a crystalline polypropylene containing at least 5% by weight of the modified polypropylene,
   (b) 20–45 parts by weight of a polyamide having a melt viscosity $\eta_b$ 1.0–5.0 times the melt viscosity $\eta_a$ of the component (a) at the shear rate when the melt mixing of the components (a), (b) and (c) is effected, and
   (c) 2–60 parts by weight, based on 100 parts by weight of the total of the components (a) and (b), of a modified ethylene-α-olefin copolymer rubber obtained by grafting an ethylene-α-olefin copolymer rubber having a Mooney viscosity $ML_{1-4}$(100° C.) of 10–150 and an ethylene content of 30∝90% by weight with 0.03–5 parts by weight, based on 100 parts by weight of the ethylene-α-olefin copolymer rubber, of an unsaturated carboxylic acid or its derivative.

2. A composition according to claim 1, wherein the modified polypropylene has a monomer grafting degree of 0.03% by weight or more and a melt index of 0.5–200 g/10 min.

3. A composition according to claim 1, wherein the modified ethylene-α-olefin copolymer rubber has a monomer grafting degree of 0.05–5.0% by weight and a melt index of 0.01–20 g/10 min.

* * * * *

UNITED STATES PATENT AND TRADEMARK OFFICE
CERTIFICATE OF CORRECTION

PATENT NO. : 4,988,764
DATED : January 29, 1991
INVENTOR(S) : Takeyoshi NISHIO et al.

It is certified that error appears in the above-identified patent and that said Letters Patent is hereby corrected as shown below:

Title page:
  In Section [73] Assignee, change "Toyota Jidosha Kabushiki Kaisha" to --Ube Industries, Ltd.--.

Signed and Sealed this

Tenth Day of November, 1992

Attest:

DOUGLAS B. COMER

Attesting Officer   Acting Commissioner of Patents and Trademarks